United States Patent Office 3,636,103
Patented Jan. 18, 1972

3,636,103
TETRAALKYL SULFOXIMINIUM SALTS AS CATIONIC BACTERICIDES
Eugene P. Gosselink, Colerain Township, Hamilton County, Ohio, assignor to The Procter & Gamble Company, Cincinnati, Ohio
No Drawing. Filed Dec. 29, 1969, Ser. No. 888,938
Int. Cl. C07c 145/00
U.S. Cl. 260—551 S     3 Claims

ABSTRACT OF THE DISCLOSURE

Tetraalkyl sulfoximinium salts having one long-chain alkyl group of 10 to 16 carbon atoms are effective cationic bactericides. Three methods of preparation are given; each begins with dialkyl sulfoximine and adds alkyl groups sequentially to nitrogen.

BACKGROUND OF THE INVENTION

Field of the invention

It is a well-known art to use quaternary ammonium salts as cationic bactericidal agents. Although such compounds are indeed useful, researchers have continued their efforts to find effective alternatives. Presently known bactericides can be limited for specific applications by their solubility, toxicity toward animal or man, compatibility with other ingredients of a bactericidal composition, and other physical and chemical properties.

It is the object of the instant invention to provide another and outstandingly active class of compounds for bactericidal use.

Prior art

Certain members of a new class of compounds, sulfoximinium salts, were disclosed by C. R. Johnson et al. in JACS 90 (14), 3890-1 (1968), JACS 90 (24), 6852-4 (1968) and Tetrahedron Letters 34, 3719-22 (1968). These compounds were prepared for the purpose of synthesizing sulfur ylides and no other utility was suggested.

As will be described in detail hereinafter, the compounds of the instant invention are separate and distinct chemical entities, within this broad class of compounds, which have been unexpectedly found highly effective and useful as bactericidal agents.

SUMMARY OF THE INVENTION

It has been newly discovered that a high degree of bactericidal activity is provided by an N,N,S,S-tetraalkyl sulfoximinium salt having the Formula A or B:

$$
\begin{array}{cc}
A & B \\
\overset{O}{\underset{R^3-N^\oplus-R^4}{R^1-\overset{\uparrow}{S}-R^2, X^\ominus}} & \overset{O}{\underset{R^1-N^\oplus-R^4}{R^3-\overset{\uparrow}{S}-R^2, X^\ominus}}
\end{array}
$$

wherein X is an anion selected from the group consisting of chloride, bromide, and fluoroborate; $R^1$ is a long-chain alkyl group having from 10 to 16 carbon atoms; $R^2$ is methyl or ethyl; $R^3$ is methyl or ethyl; and $R^4$ is methyl, ethyl, or benzyl.

DETAILS OF THE INVENTION

Characterization of effective compounds

Tetraalkyl sulfoximinium salts, defined broadly, have a cationic portion containing a sulfur atom singly bonded both to a nitrogen atom and to an oxygen atom, with a single net positive charge. Four alkyl groups are attached, two to sulfur and two to nitrogen.

$$
\overset{O}{\underset{R-N^\oplus-R}{R-\overset{\uparrow}{S}-R, X^\ominus}}
$$

The tetraalkyl sulfoximinium salts of the instant invention are those exhibiting a high degree of bactericidal effectiveness which are characterized infra.

One and only one of the alkyl groups of the formula above is a long-chain group having from 10 to 16 carbon atoms. Preferably it is dodecyl. The long-chain group can be attached either to the sulfur atom [as shown in Formula A preceding] or to the nitrogen atom [as in Formula B]. It is preferred that this long-chain group be attached to sulfur.

One of the alkyl groups attached to the nitrogen atom can be, within the contemplation of the instant invention, methyl, ethyl, or benzyl.

The other two alkyl groups, not defined in the two paragraphs immediately preceding, can be, independently, methyl or ethyl.

The anionic portion of the sulfoximinium salt is, with respect to bactericidal properties, governed by normal factors as recognized by those skilled in the art. Solubility under conditions of use is the main requirement. Bromide, chloride, tetrafluoroborate, sulfate, lactate, and nitrate are suitable, with the firstmentioned three being preferred.

Preferred sulfoximinium salts of the instant invention are the following: N,N-diethyl, S-dodecyl, S-methyl sulfoximinium chloride; N,N-dimethyl, S-dodecyl, S-methyl sulfoximinium chloride; N-tetradecyl, N-methyl, S,S-dimethyl sulfoximinium fluoroborate; N-benzyl, N-methyl, S-decyl, S-methyl sulfoximinium bromide; and N-dodecyl, N-benzyl, S-methyl, S-ethyl sulfoximinium bromide.

Relation to the prior art

As mentioned supra, Johnson has made certain sulfoximinium salts for purposes of synthesizing sulfur ylides. None of his compounds has a long-chain group which is required for the antibacterial properties possessed by the compounds of the instant invention. In addition, all of his compounds, unlike the compounds of the instant invention, have an aryl group attached to the sulfur atom. The compounds disclosed by Johnson are, specifically: N,N-dimethyl, S-benzyl, S-methyl sulfoximinium fluoroborate; N,N-dimethyl, S-tolyl, S-methyl sulfoximinium fluoroborate; and N-methyl, N-(2-carbomethoxyethyl), S-benzyl, S-methyl sulfoximinium tetraphenyl boron.

Preparation of the compounds of the invention

The tetraalkyl sulfoximinium salts of the instant invention can be readily prepared from the corresponding dialkyl sulfoximines. These compounds are well-known in the art, and their usual methods of preparation are discussed in Kharasch, "Organic Sulfur Compounds," vol. 1, Pergamon Press, N.Y. (1961), pages 164, 347, 458. Another method is described in a co-pending patent application by E. P. Gosselink and R. G. Laughlin, attorney docket number 1545. The method of preparation is immaterial to the reactions described below.

Three separate and distinct chemical syntheses are given as Equations (a), (b), and (c):

$$
\underset{\underset{NH}{|}}{\overset{O}{\underset{|}{R^1-\overset{\uparrow}{S}-R^2}}} \xrightarrow{R_3{}^3OBF_4} \underset{\underset{R^3NH}{|\oplus}}{\overset{O}{\underset{|}{R^1-\overset{\uparrow}{S}-R^2, BF_4{}^\ominus}}} \xrightarrow{K_2CO_3} \xrightarrow{R_3{}^4OBF_4}
$$

$$
\underset{\underset{R^3NR^4}{|\oplus}}{\overset{O}{\underset{|}{R^1-\overset{\uparrow}{S}-R^2, BF_4{}^\ominus}}} \quad (a)
$$

$$
\underset{\underset{NH}{|}}{\overset{O}{\underset{|}{R^1-\overset{\uparrow}{S}-R^2}}} \xrightarrow{NaK} \xrightarrow{R^3I} \underset{\underset{R^3N}{|}}{\overset{O}{\underset{|}{R^1-\overset{\uparrow}{S}-R^2}}} \xrightarrow{R_3{}^4OBF_4} \underset{\underset{R^3NR^4}{|\oplus}}{\overset{O}{\underset{|}{R^1-\overset{\uparrow}{S}-R^2, BF_4{}^\ominus}}} \quad (b)
$$

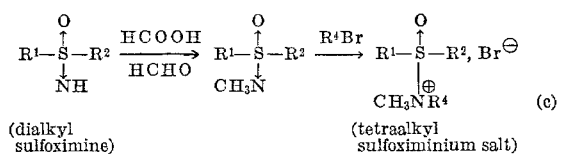

(dialkyl sulfoximine)      (tetraalkyl sulfoximinium salt)   (c)

Utility

The compounds of the instant invention are useful bactericides for sanitizing eating utensils in restaurants; eggs and related equipment in egg drying plants; milkers' hands, milking machines, and cows' udders in dairies; diapers in laundries; bathing suits; toilets and many other applications of this type.

Specific embodiments of the invention

Example 1

The reactions of Equation (a) supra were applied to dodecyl methyl sulfoximine as follows:

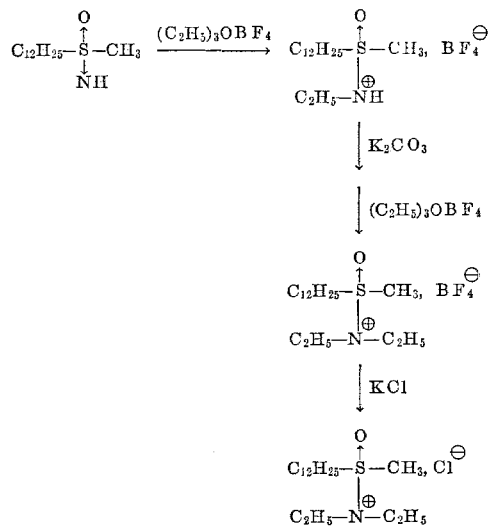

Conditions of preparation were as follows:

A 27 g. (0.011 mole) portion of dodecyl methyl sulfoximine was dissolved in enough methylene chloride to make 10 ml. of solution. This was added dropwise to 10 ml. of methylene chloride which contained 4.4 g. (0.023 mole) triethyloxonium fluoroborate. The system was allowed to stand several days and then was extracted twice with water. The organic phase was then shaken with 50% $K_2CO_3$ solution, dried and then treated again with triethyloxonium fluoroborate as above. After allowing to stand for 17½ hours, the solution was washed with water and evaporated to leave as an oil N,N-diethyl, S-dodecyl, S-methyl sulfoximinium tetrafluoroborate which showed the desired N-ethyl groups in the NMR spectrum. $(CDCl_3)$ $\tau$ 6.5 ($q$, methylene), $\tau$ 8.7 ($t$, methyl). This oil was converted to the chloride salt by taking up in chloroform and shaking with saturated potassium chloride solution which caused separation of insoluble potassium fluoroborate. The organic layer was dried and evaporated to give N,N-diethyl, S-dodecy, S-methyl sulfoximinium chloride as an oil.

Bactericidal assay was carried out by determining the percent kill of typical organisms by exposing a suspension of bacteria to the test compound, removing aliquots of the treated suspension at a specified time interval, inoculating into 5% horse serum, plating in nutrient agar, incubating for 48 hours, and noting the number of bacterial colonies that develop.

Specifically, this series of tests was carried out by determining the percent kill of *Staphylococcus aureus* FDA 209 (a Gram positive organism) with an exposure time of 10 minutes to the test compounds at a concentration of 100 parts per million. The suspending medium was FDA nutrient broth and the inoculum size was approximately $250 \times 10^6$ cells/ml. One ml. of the suspension was transferred after 10 minutes of contact into 100 ml. of sterile horse serum in distilled water. Additional dilutions were made as necessary to get the number of colonies per plate into a countable range. The dilutions were placed in nutrient agar and incubated at 37° C. for 48 hours. Colonies were then counted and the percent reduction in viable count was determined in relation to a colony count attained by plating the inoculated broth without an active agent.

Percent kill of the tetraalkyl sulfoximinium salt described above was found to be 99.99% at 100 p.p.m. against *Staphylococcus aureus*. A comparable test was made with dimethyl dodecyl benzyl ammonium chloride, a commonly used and highly effective quaternary ammonium bactericidal agent. Results were identical, 99.99%, indicating that the sulfoximinium salt is fully as effective as this well-known bactericide.

The reactions of equation (a) are applied to dodecyl ethyl sulfoximine and to hexadecyl methyl sulfoximine with comparable results. N,N-diethyl, S-dodecyl, S-ethyl sulfoximine chloride and N,N-diethyl, S-hexadecyl, S-methyl sulfoximinium chloride are prepared which bring about over 99% kill at 100 p.p.m. against *Staphylococcus aureus*. Other modifications of this reaction to produce compounds of the instant invention are readily apparent to those skilled in the art.

The abovementioned compounds are made up into disinfecting solution for ultimate use as follows:

| Objects to be sanitized | Pretreatment | Preparation of sanitizing solution | Sanitizing treatment |
|---|---|---|---|
| Eating utensils, drinking glasses. | Wash in non-soap detergent; rinse. | 200 p.p.m. N,N-diethyl S-dodecyl, S-methyl sulfoximinium tetrafluoroborate in warm water. | Soak for 2 minutes. |
| Shell eggs | Wash; rinse | 200 p.p.m. N,N-diethyl, S-dodecyl, S-methyl sulfoximinium chloride in water. | Dip or spray. |
| Milkers' hands, milking machines, cows' udders. | do | 200 p.p.m. N,-N-diethyl, S-dodecyl, S-ethyl sulfoximinium chloride in water. | Bathe in solution prior to milking each cow. |
| Bathing suits | do | 800 p.p.m. N,-N-diethyl, S-hexadecyl, S-methyl sulfoximinium chloride in water. | Soak for 10 minutes. |
| Toilets | do | 400 p.p.m. N,-N-diethyl, S-dodecyl, S-methyl sulfoximinium chloride in water. | Apply. |

Discussion

Commonly available trialkyloxonium fluoroborates $R_3OBF_4$ are limited to the lower alkyl derivatives. Hence this method is chiefly applicable for attaching methyl or ethyl groups to nitrogen. Therefore, to make the compositions of this invention by this series of reactions, it is necessary to start with a sulfoximine containing one longchain alkyl group attached to sulfur.

The fluoroborate salt was converted to the chloride for purposes of the bactericidal test reported above to insure that the nature of the anion would not obscure interpretation of the results. Another reason for the conversion is to provide a basis for recovery of the boron for reuse: $KBF_4$ which is obtained from the final step of the reaction can be decomposed by heat into $BF_3$ (Mellor, "Inorganic and Theoretical Chemistry," Longmans & Green Co., N.Y. 1946, p. 127) which is needed to react with epichlorohydrin and diethyl ether in the normal synthesis or triethyloxonium fluoroborate, the original reactant used in the synthesis described supra.

This conversion is, however, not essential because the fluoroborate salt itself is an effective bactericide. When tested in the manner described above, it yields substantially the same high degree of bactericidal effectiveness.

Example 2

The reactions of Equation (b) supra were applied to dodecyl methyl sulfoximine as follows:

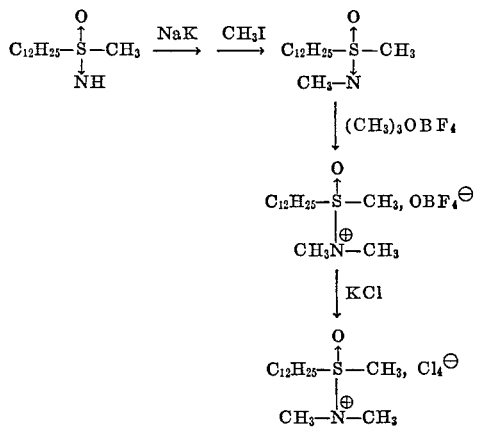

Conditions of preparation were as follows:

A 9.0 g. (0.036 mole) portion of dodecyl methyl sulfoximine was dissolved in 250 ml. benzene and 2 ml. (0.061 mole) of 55.9% potassium-44.1% sodium alloy was added. The system was stirred at room temperature for 64 hours. Then 4 ml. (0.064 mole) methyl iodide in 30 ml. benzene was added dropwise. This was stirred for one day and then let stand 1½ weeks. Another 2 ml. of methyl iodide was added and the system was allowed to stand three hours. Then it was heated briefly on steambath before adding 50 ml. methanol cautiously. The solvent was evaporated and the residue was partitioned between ether and water. The ether layer was evaporated and the oil was treated with 100 ml. of petroleum ether which caused. 1.55 g. starting sulfoximine to separate as crystals at 0° C. The petroleum ether solution was evaporated to leave a crude N-methyl, S-dodecyl, S-methyl sulfoximine. A 4.0 g. (0.015 mole) portion of this material was dissolved in 5 ml. methylene chloride and this solution was gradually added to 2.44 g. (0.016 mole) of trimethyloxonium tetrafluoroborate in 10 ml. of methylene chloride. The solution was allowed to stand one hour before evaporating the solvent. The residue was swirled with a 3:1 mixture of ether:petroleum ether and 1.7 g. crystalline N,N-dimethyl, S-dodecyl, S-methyl sulfoximinium tetrafluoroborate was collected by filtration. A second crop of 2.1 g. was obtained by cooling to 4° C. These two crops were combined and shaken with 30 ml. CHCl and 10 ml. saturated aqueous potassium chloride sodlution. The chloroform layer was evaporated and the resulting oil was crystallized by shaking with ether-petroleum ether. The hygroscopic crystals of N,N-dimethyl, S-dodecyl, S-methyl sulfoximinimum chloride were collected and the structure was confirmed by NMR=(CDCl) τ 5.42 (t 2

)

5.72 (S, 3, S—CH₃), 6.75 (S, 6, N—CH₃), 7.9–8.9 (M, 2D, —CH₂—), 9.12 (t. 3, C—CH₃).

Bactericidal assay on the chloride salt was carried out as described supra. Percent kill was 99.7% at 100 p.p.m. against *Staphylococcus aureus*. Bacterial assay on the fluoroborate salt yields substantially the same results.

The reactions of Equation (b) are applied to dodecyl ethyl sulfoximine with comparable results. N,N-dimethyl, S-dodecyl, S-ethyl sulfoximinium chloride causes over 99% kill at 100 p.p.m. against *Staphylococcus aureus*.

When the methyl iodide of Equation (b) is replaced with ethyl iodide and everything else is unchanged, the resultant compound is N-methyl, N-ethyl, S-dodecyl, S-methyl sulfoximinium chloride. When methyl iodide is replaced with benzyl iodide, the resultant compound is N-methyl, N-benzyl, S-dodecyl, S-methyl sulfoximinium chloride. Each of these compounds causes over 99% kill at 100 p.p.m. against *Staphylococcus aureus*. Other modifications of this reaction to produce compounds of the instant invention will be apparent to those skilled in the art.

Discussion

The alkyl portion of the alkyl iodide reactant may be of any length, so by this series of reactions it is straightforward to prepare compounds of the invention with the long-chain alkyl group on either sulfur or nitrogen. By using benzyl iodide, the benzyl group may readily be placed on nitrogen. The second alkyl group on nitrogen is derived from the fluoroborate reactant and is limited, as in Example 1, to lower alkyl groups only.

Example 3

The reactions of Equation (c) were applied to dodecyl methyl sulfoximine as follows:
Conditions of preparation were as follows:

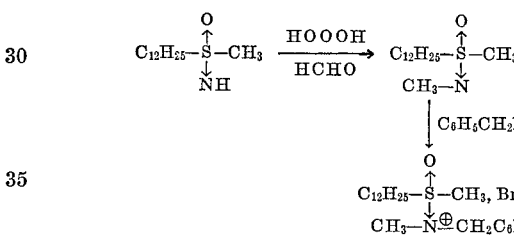

Conditions of preparation were as follows:

A 1.2 g. portion of N-methyl, S-dodecyl, S-methyl sulfoximine prepared as in the previous example was heated at 50° C. with 1 ml. of benzyl bromide. After four hours, the solution was cooled and extracted three times with petroleum ether to give N-benzyl, N-methyl, S-dodecyl, S-methyl sulfoximinium bromide.

The reactions of Equation (b) are applied to decyl methyl sulfoximine with comparable results.

Each of these compounds causes over 99% kill at 100 p.p.m. against *Staphylococcus aureus* when tested in the manner described supra.

Other modifications of this reaction to produce compounds of the instant invention will be apparent to those skilled in the art. Long-chain or short-chain alkyl bromides can be used instead of benzyl bromide to synthesize other species of this invention.

Discussion

An alternative preparation of N-methyl, S-dodecyl, S-methyl sulfoximine is via methylation of S-dodecyl, S-methyl sulfoximine with formaldehyde and formic acid. This is a well-known alkylation method for amines, and proceeds as given in detail by Fieser & Fieser, "Reactants for Organic Synthesis," Wiley, N.Y. (1967), page 399.

Example 4

The reactions of Equation (b) are applied to dimethyl sulfoximine as follows:

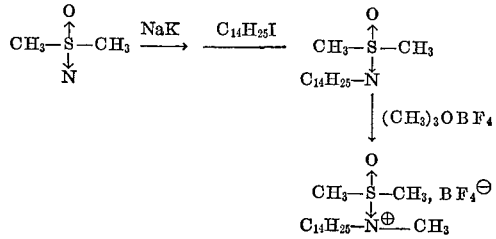

The product of this reactions is N-tetradecyl, N-methyl, S,S-dimethyl sulfoximinium fluoroborate.

The reactions of Equation (b) are applied to methyl ethyl sulfoximine with comparable results, resulting in the formation of N-tetradecyl, N-methyl, S-methyl, S-ethyl sulfoximinium fluoroborate.

Each of these compounds causes over 99% kill at 100 p.p.m. against *Staphylococcus aureus* when tested in the manner described supra.

Other modifications of this reaction to produce compounds of the instant invention will be apparent to those skilled in the art.

Example 5

The reactions of Equation (b) and Equation (c) are combined to attach a benzyl group as well as a long-chain alkyl group on nitrogen:

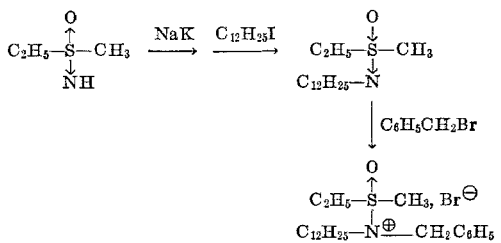

The product of these reactions is N-dodecyl, N-benzyl, ethyl, S-methyl, S-ethyl sulfoximinium bromide.

This compound causes over 99% kill at 100 p.p.m. against *Staphylococcus aureus* when tested in the manner described supra.

Other combinations of Equations (a), (b), and (c) supra to produce compounds of the instant invention are readily apparent to those skilled in the art.

What is claimed is:

1. N,N,S,S-tetraalkyl sulfoximinium salt having the Formula A or B:

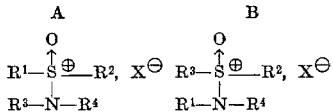

wherein X is an anion selected from the group consisting of chloride, bromide, and fluoroborate; $R^1$ is a long-chain alkyl group having from 10 to 16 carbon atoms; $R^2$ is methyl or ethyl; $R^3$ is methyl or ethyl; and $R^4$ is methyl, ethyl, or benzyl.

2. The sulfoximinium salt of claim 1 having Formula A.

3. The sulfoximinium salt of claim 2 wherein $R^1$ is dodecyl.

References Cited

UNITED STATES PATENTS 3,255,116  6/1966  Berry _____ 260—551 S

OTHER REFERENCES

Jacs 90: 3890–3891 (1968), Johnson et al.

HENRY R. JILES, Primary Examiner

S. D. WINTERS, Assistant Examiner

U.S. Cl. X.R.

424—320

UNITED STATES PATENT OFFICE
CERTIFICATE OF CORRECTION

Patent No. 3,636,103                    Dated January 18, 1972

Inventor(s) Eugene P. Gosselink

It is certified that error appears in the above-identified patent and that said Letters Patent are hereby corrected as shown below:

Column 4, line 1, delete "S-dodecy" and insert --- S-dodecyl ---.

Column 5, lines 20-24, delete " 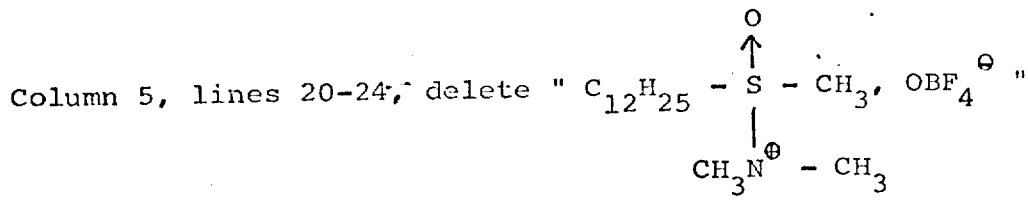 "

and insert therefor --- 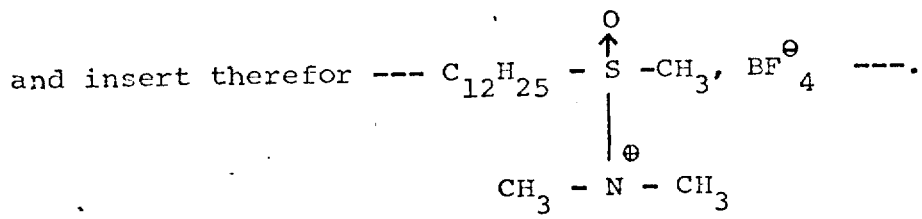 ---.

Column 5, line 58, delete "CHCl" and insert therefor --- $CHCl_3$ ---.
Column 5, line 63, delete "sulfoximinimum" and insert therefor --- sulfoximinium ---.
Column 5, line 64, delete "(CDCl)" and insert therefor --- $(CDCl_3)$ ---.
Column 5, line 64, after "t" and before "2" insert --- , ---.
Column 6, line 30, delete "HOOOH" and insert --- HCOOH ---.

Column 6, lines 66-69, delete " 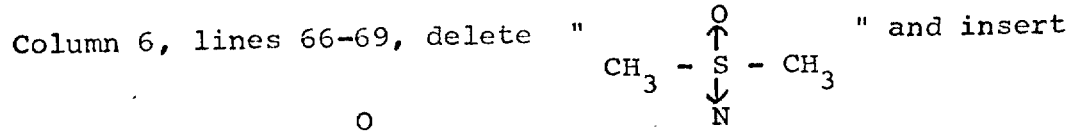 " and insert therefor --- 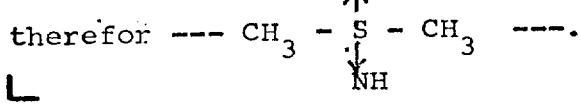 ---.

Signed and sealed this 11th day of July 1972.

(SEAL)
Attest:

EDWARD M. FLETCHER, JR.          ROBERT GOTTSCHALK
Attesting Officer                Commissioner of Patents